March 17, 1970 W. G. LIVEZEY 3,500,633
CONTROL LINKAGE FOR HYDROSTATIC UNITS
Filed May 21, 1968 3 Sheets-Sheet 2

INVENTOR.
William G. Livezey
BY
a. M. Heiter
ATTORNEY

March 17, 1970

W. G. LIVEZEY 3,500,633

CONTROL LINKAGE FOR HYDROSTATIC UNITS

Filed May 21, 1968

INVENTOR.
William G. Livezey
BY
a.M. Heiter

ATTORNEY

United States Patent Office 3,500,633
Patented Mar. 17, 1970

3,500,633
CONTROL LINKAGE FOR HYDROSTATIC UNITS
William G. Livezey, Indianapolis, Ind., assignor to General Motors Corporation, Detroit, Mich., a corporation of Delaware
Filed May 21, 1968, Ser. No. 730,760
Int. Cl. F02b *41/00, 73/00;* F16d *31/06*
U.S. Cl. 60—19
21 Claims

ABSTRACT OF THE DISCLOSURE

Disclosed herein is an operator control linkage for a hydrostatic transmission which is responsive, to engine overload and engine overspeed conditions, to reduce or increase the displacement of the hydrostatic unit if one of these conditions should occur. The linkage has an adjustable pivot point which is positionable in response to the input power level between the operator and the servo control to change the relationship between the operator input movement and servo control movement such that a given operator movement has a diminishing affect on servo control movement when a power overload occurs. When used with a drive by steering vehicle utilizing two hydraulic pumps and two hydraulic motors, the overload control is operative, during steer to reduce the displacement of both pumps proportionally to maintain a constant turn radius. Also included is an overspeed control which operates on the control linkage to increase the displacement of the hydrostatic pump when an engine overspeed is about to occur.

This invention relates to control linkages and more particularly to control linkages for hydrostatic transmission which linkages are responsive to engine parameters to modify the transmission drive ratio.

A hydrostatic transmission provides, within a range, an infinitely variable drive ratio between the engine and the drive wheels. When combined with an operator control, not only is the drive infinitely variable within a range but the transmission may be held, by the operator, at any fixed ratio within the range as opposed to a hydrodynamic transmission in which the drive ratio of the hydrodynamic device such as a torque convertor, is dependent on load. However, the hydrostatic transmission, unlike the hydrodynamic transmission, does not provide a slipping member, such as a torque converter, between the power source and the drive load to prevent overloading of the power source. Therefore, it is necessary to provide an overload control with a hydrostatic transmission which will effectively reduce the drive ratio when an overload is about to occur. When the transmission is used to provide steer control as well as drive ratio, such as in a track-laying vehicle, the overload control should not be permitted to change the rate of steer in proportion to the rate of drive speed when an overload is present. The control linkage and overload control of the present invention provides for preserving the rate of steer.

It is, therefore, an object of this invention to provide in a control linkage an improved overload control which is responsive to engine overload to reduce the drive ratio.

Another object of this invention is to provide a control linkage for a steer by driving vehicle in which the drive ratio and steer ratio are simultaneously controlled during overload.

Another object of this invention is to provide an overload control linkage including a variable pivot point which is responsive to variable input power levels to protect against overload at all input power levels.

A further object of this invention is to provide in a control linkage for a hydrostatic transmission, an engine overspeed control including a one-way drive piston which is operative to increase the drive ratio of the transmission when an overspeed condition is about to occur.

A still further object of this invention is to provide in a transmission control linkage having an overload or overspeed control, an "anti-hunting" linkage which provides a feedback signal between the overload or overspeed control and the overload or overspeed sensor.

These and other objects and advantages will become more apparent from the following description of the invention illustrated in the accompanying drawings in which.

Figure 1:
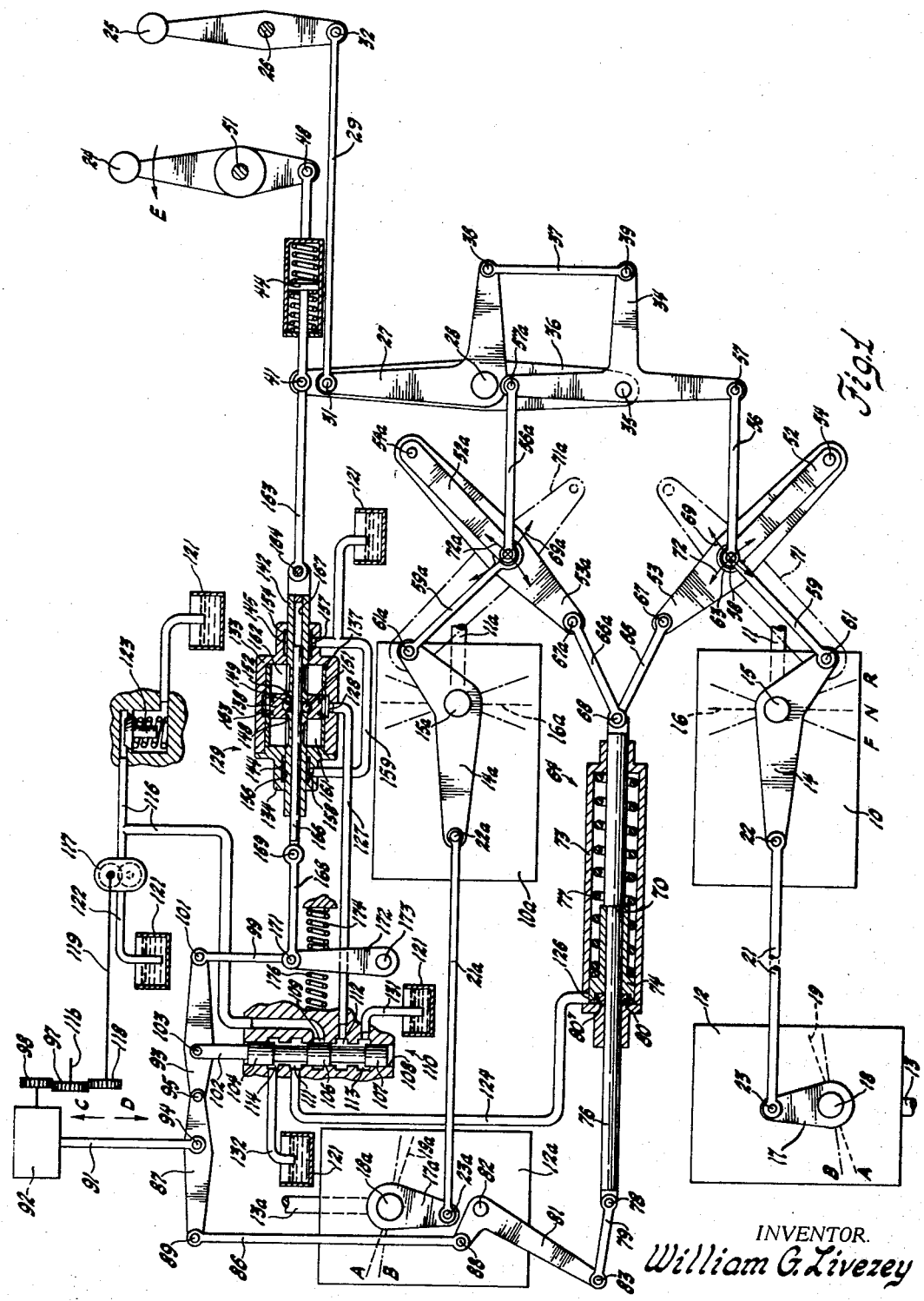
FIGURE 1 is a plan view partly in section showing the control linkage with overload and overspeed controls for a hydrostatic transmission.

Referring to the drawings there is shown in FIGURE 1 a hydrostatic transmission and linkage control having two variable displacement hydrostatic pumps 10 and 10a and two variable displacement motors 12 and 12a.

The hydrostatic pumps 10 and 10a are driven by an engine through their respective input shafts 11 and 11a, which are geared together and turn at the same speed. The pumps 10 and 10a are hydraulically connected to their respective motors 12 and 12a which have output shafts 13 and 13a drivingly connected to the right and left tracks respectively of the vehicle. The hydrostatic pumps 10 and 10a and the hydrostatic motors 12 and 12a are preferably of the swash plate type having rotary servo controls, for controlling displacement, similar to that shown in U.S. Patent 2,296,929.

A pair of pump control levers 14 and 14a are attached to the servo controls at 15 and 15a and operate in cooperation with the servo controls to tilt the pump swash plates 16 and 16a from the neutral position N to either a forward F or a reverse R angle.

A pair of motor control levers 17 and 17a attached to the motor servos at 18 and 18a serve to tilt the motor swash plates 19 and 19a through a servo mechanism, similar to that used for the pumps from a maximum angle A to a minimum angle B, the motor swash plate angles being always in the positive direction.

The lever 14 is connected to lever 17 by a link 21 at pivot points 22 and 23, the geometry of this connection as shown is such that when the lever 14 is moved in either direction from its zero or neutral position shown, the lever 17 and swash plate 19 will move from its maximum displacement position A toward its minimum displacement position B. This results in the motor shaft starting from zero speed and increasing to its maximum speed in either direction of rotation depending on which direction the pump swash plate is displaced.

The pump control levers 14 and 14a, and therefore the displacement of the pumps 10 and 10a, are controlled by the operator with a ratio control lever 24 and a steer control lever 25 which are connected to the control levers 14 and 14a by a lever and link system. The connection between the ratio and steer control levers 24 and 25 and the pump control levers 14 and 14a are similar. Therefore, only the connection to pump control lever 14 will be described. Corresponding linkage for pump control lever 14a, not affecting control lever 14, will be given the same numerical designation with an "a" suffix.

The steer control lever 25, which is pivotally mounted on a stationary pivot 26 is connected to a bell crank 27 which is pivoted at a stationary pivot 28, by a steer-control rod 29 at pivot points 31 and 32. The bell crank 27 is connected to a T lever 34, which is pivotally mounted at pivot point 35 at the lower end of ratio control lever 36, by a link 37 at pivot points 38 and 39. The ratio control lever 36 is also pivotally mounted on the stationary pivot 28 and has its upper end pivotally connected at 41 to a preloaded spring yield link 44 which is pivotally connected at 48 to the ratio control lever 24, which is pivotally mounted on a stationary pivot 51. The T lever 34 is connected to an adjustable lever 52, which is pivotally mounted on an overload control lever 53 at pivot 54, by a link 56 at pivots 57 and 58. The adjustable lever 52 is connected to the pump control lever 14 by a link 59 at pivots 58 and 61. The overload control lever 53 is pivotally mounted on a stationary pivot 63, which is axially aligned with pivot 58 in the position shown, and is connected to an overload motor 64 by a link 66 at pivots 67 and 68.

It is seen that a fore and aft motion of spring yield link 44, by the ratio control lever 24, produces a simultaneous fore and aft motion of links 56 and 56a in the same direction since pivot points 28, 35, 38 and 39 form a rectangle in the neutral position shown and a parallelogram in any position other than neutral. A fore and aft motion of the steer control rod 29 produces a simultaneous fore and aft motion of control links 56 and 56a, but in opposite directions to effect steer.

With overload control lever 53 in the position shown, a fore and aft movement of the link 56 will cause pivot point 58 to swing through an arc 69 about pivot 54, this motion acting through link 59 moves pump control lever 14 to a forward or reverse position. The distance between pivot points 58 and 54 is the same as the distance between pivot points 58 and 61 so that when lever 53 is swung to the alternate position 71, pivot point 54 coincides with pivot point 61 and a fore and aft motion of link 56 causes pivot point 58 to swing through an arc 72 which produces no motion of the pump control lever 14 and the pump is held in neutral position irrespective of the position of control rod 56. As lever 53 is swung from the position shown toward the alternate position, movement of control link 56 has a diminishing effect on the movement of pump lever 14 from its neutral position.

The overload control motor 64 includes a cylinder 73, a piston 74 slidably mounted in cylinder 73, a piston rod 76 and a spring 77 held in compression between the piston 74 and one end of the cylinder 73. The piston rod 76 has pivot point 68 at one end and a pivot point 78 at the other end and is secured to the piston 74 by a retaining ring 80 held in a groove 80' and a shoulder 70 on the piston rod 76. A link 79 connects the piston rod 76 to a feedback bell crank or lever 81, which is pivotally mounted on a stationary pivot 82, at pivot points 78 and 83. A link 86 is connected between the feedback lever 81 and a governor lever 87 at pivot points 88 and 89. The governor lever 87 is pivotally connected to a governor rod 91, which responds to the speed of a governor 92 and a valve lever 93 at pivot points 94 and 95. The governor 92 is driven at the same speed as the input shafts 11 and 11a by shaft 11b and gears 97 and 98. Thus the governor 92 is driven proportional to transmission input speed such that as the input speed increases, the governor rod 91 moves in the direction of arrow C and as input speed decreases, the governor rod moves in the direction of arrow D. The valve lever 93 is also pivotally connected to a link 99 at pivot 101 and has a valve spool 102 pivotally connected thereto at pivot 103.

The valve spool 102, having three equal diameter lands 104, 106 and 107 spaced along its length, is slidably disposed in a valve bore 108, with which it cooperates to form a control valve 110, which has an inlet port 109, an overload port 111, an overspeed port 112 and two exhaust ports 113 and 114. The inlet port 109 is in fluid communication via passage 116 with a pump 117 which is driven by shaft 11b through gears 97 and 118 and a shaft 119. In operation, the pump 117 receives fluid from a reservoir 121 via passage 122 and delivers fluid via passage 116 to the inlet port 109, the valve bore 108 and a poppet-type relief valve 123 which limits the maximum fluid pressure in passage 116. In the normal operating position shown, the inlet port is closed by the land 106. However, if an overload should occur thereby reducing the input speed, the governor rod moves in the direction of arrow D causing the governor lever 87 to pivot clockwise about point 89 thereby producing downward movement of the valve spool 102 so that the inlet port 109 is open between lands 106 and 104, to the overload port 111, and via a passage 124 to the overload motor 64 at port 126. If an overspeed should occur, the governor rod moves in the direction of arrow C causing the governor lever to pivot counterclockwise about point 89 thereby producing upward movement of the valve spool 102 so that the inlet port 109 is open, between lands 106 and 107, to overspeed port 112 and via a passage 127 to a port 128 of an overspeed control 129. When the overspeed port 112 and the overload port 111 are not open to the inlet port 109, they are open to the reservoir 121 through exhaust ports 113 and 114 and passages 131 and 132 respectively.

Figure 3:
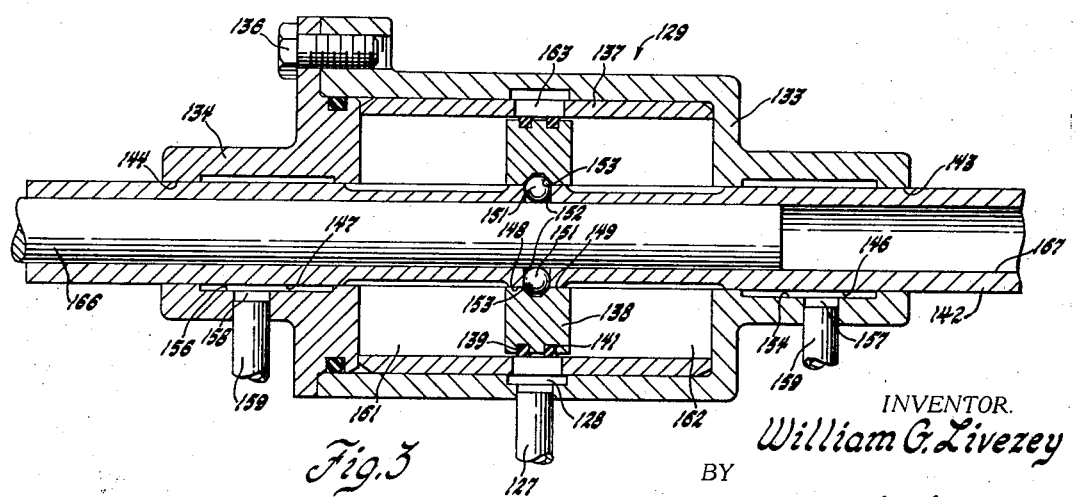
FIGURE 3 is a sectional view of a portion of the overspeed control shown in FIGURE 1.

The overspeed control 129, as seen in FIGURES 1 and 3, includes a housing 133, an end cap 134 secured to the housing 133 by fasteners 136, a cylinder 137 mounted in the housing 133 abutting the end cap 134, a piston 138 having seal rings 139 and 141 mounted thereon in sealing relation with the cylinder 137, and a piston rod 142 slidably disposed in bores 143 and 144 of the housing 133 and the end cap 134 respectively. The piston rod 142 has three equal diameter lands 146, 147 and 148 slidably disposed within the bores 143 and 144 and a central bore 149 of the piston 138. The piston 138 and piston rod 142 are drivingly connected by balls 151 which are freely mounted in radial bores 152 in piston rod 142 and annular V shaped groove 153 in the bore 149 of piston 138. The bores 143 and 144 have recessed portion 154 and 156, respectively, which are connected via ports 157 and 158 and passages 159 to the reservoir 121. The piston 138 and the cylinder 137 cooperated to provide two chambers 161 and 162 which, when the piston 138 is in the position shown, are both open through a radial bore 163, in the cylinder 137, to the port 128 and via passage 127 to the control valve 110. As the piston 138 is moved to the left, the chamber 161 is closed to port 128 by seal ring 139 and opened to recess 156 between lands 147 and 148 while the chamber 162 remains open to port 128, and as the piston 138 is moved to the right, the chamber 162 is closed to port 128 by the seal ring 141 and opened to the recess 154 between lands 146 and 148 while the chamber 161 remains open to port 128. The piston rod 142 is connected by a link 163 to the ratio control lever 36 at pivot points 164 and 41. Thus, the piston rod 142 and the piston 138 are moved fore and aft by the ratio control lever 24. A pickup or output rod 166 is slidably disposed within a central axial bore 167 in the piston rod 142. The outside diameter of the pickup rod 166 contacts the balls 151. The pickup rod 166 is connected to the link 99 by a link 168 at pivot points 169 and 171. Also connected at pivot 171 is an idler lever 172 which is pivotally mounted on a stationary pivot 173 and urged to a central position, as shown, by centering springs 174 and 176. As the piston rod 142 and the piston 138 are moved by the ratio control lever 24, the balls 151 ride freely over the surface of the pickup rod 166.

For the following description of operation, it is assumed that the transmission and control linkage are assembled in a crawler tractor-type vehicle.

A crawler tractor being a working type vehicle is normally operated at full throttle position with the engine under control of its own engine governor which keeps the engine at governed speed when it is unloaded or slightly below governed speed when loaded due to governor droop. The transmission control governor rod 91 keeps valve spool 102 in the position shown when the shafts 11, 11a and 11b are at governed speed.

To start the tractor moving forward, shift lever 24 is moved to a forward position in the direction of arrow E, this motion is transmitted through the linkage and moves pump control levers 14 and 14a to a corresponding forward position. The amount of movement imparted to lever 24 is determined by the tractor speed desired. Movement of the shift linkage also moves piston 138 in the overspeed control from its centered position, with the balls 151 moving freely along pickup rod 166 so pivot point 171 and idler lever 172 do not move.

Should the load be greater than the tractor can move, the engine speed will decrease to a speed indicating overload. This reduced speed is sensed by the governor 92 which moves rod 91 and valve spool 102 downward so that valve spool 102 closes exhaust port 114 and opens the inlet port 109 to feed pressure fluid through overload port 111 to overload motor 64 causing piston 74 and rod 76 to move to the right. This motion swings levers 53 and 53a from the position shown toward the alternate or neutral position 71 causing arc 69 to swing toward arc 72. This moves pump control levers 14 and 14a toward their neutral position thereby reducing the displacement of the pumps thus relieving the load on the engine so the engine speed can increase.

Since the action of overload motor 64 is quite rapid, it would swing levers 53 and 53a to the full neutral position before the engine and governors have time to react to the reduction in engine load which would result in severe governor hunting. To prevent this hunting, movement of piston rod 76 to the right is fed back through the link 79, feedback lever 81, link 86, and governor lever 87 to move valve 107 upward, closing port 109, thus arresting the movement of piston rod 76 unless a further reduction in engine speed occurs.

It will be observed that moving levers 53 and 53a from the position shown toward the alternate position reduces the speed of the vehicle tracks proportionately whether the vehicle is being driven straight or in steer. Thus upon overload, only the mean vehicle speed is reduced while any radius of turn that was being negotiated is maintained. This holds true for all radii turns down to a full pivot whether the vehicle is travelling forward or backward.

Overspeeding of the engine can occur when descending a steep grade with a heavy load and the driver attempts to slow the vehicle, through down-shifting the transmission, by moving the shift lever toward the neutral position.

Governor 92 senses this overspeed and moves control rod 91 and valve 102 upward closing exhaust port 113 and opening port 109 admitting pressure oil to port 112 and port 128 of the overspeed control 129. If the vehicle is moving forward, the piston 138 will be displaced to the right and pressure oil at port 128 will enter chamber 161 while chamber 162 will be open to exhaust between lands 146 and 148 and recess 154.

The pressure in chamber 161 forces piston 138 to the right. This force acting through angular face of V groove 153 on the balls 151 forces the balls inward, gripping the pickup rod 166 and moves both rods 166 and 142 to the right which moves the ratio-control lever 36 in the upshift direction to reduce the speed of the engine. This motion also compresses the spring in yield link 44 and the shift lever 24 remains in the position set by the operator.

Since the overspeed piston can move more rapidly than the engine speed and governor can respond, a hunting condition would exist. This hunting is prevented by the movement of pickup rod 166 being fed back through the toggle linkage formed by the idler lever 172 and link 99 to move pivot point 101 and valve 102 downward thus closing port 109 and arresting the movement of piston 138 unless further overspeeding of the engine occurs. It is seen that the arrangement of the toggle linkage and the porting of the overspeed cylinder provides overspeed protection in either the forward or reverse direction.

Also, it should be appreciated that when the pressure is removed from the piston 138, the pickup rod 166 will no longer be held by the balls 151, so that the centering springs 174 and 176 will cause the toggle linkage to assume its central position, as shown. Also, as the overspeed condition is relieved, the yield link 44 will urge the levers 52 and 52a, through the connecting linkage, to assume the position established by the operator through the ratio and steer control levers 24 and 25.

Figure 2:
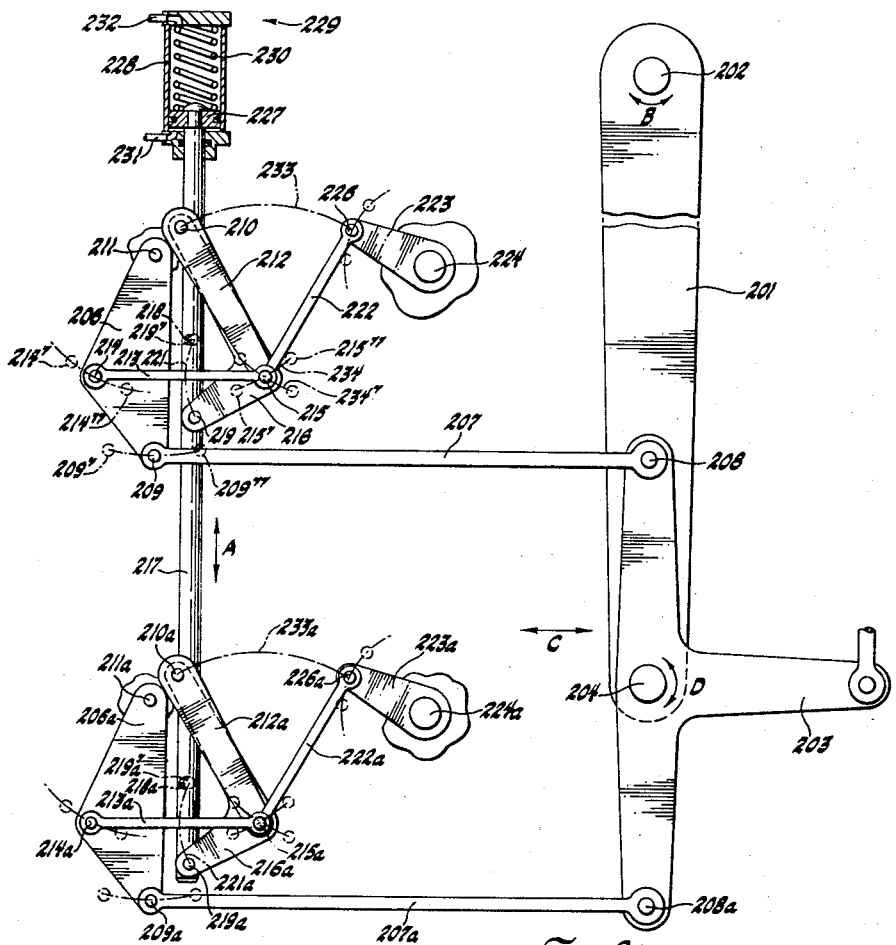
FIGURE 2 is a plan view of another form of the control linkage with an overload control.

The control linkage disclosed in FIGURE 2 includes a ratio lever 201 pivotally mounted at stationary pivot 202 and a T lever 203 which is pivotally mounted at pivot 204 on the ratio lever 201. The T lever 203, operative to control steer maneuvers, is controlled by an operator through linkage, not shown, and is connected to a pair of levers 206 and 206a by input links 207 and 207a respectively at pivot points 208, 208a, 209 and 209a. The levers 206 and 206a are pivotally mounted on stationary pivots 211 and 211a and connected to adjustable levers 212 and 212a by links 213 and 213a at pivots 214, 214a, 215 and 215a. The adjustable levers 212 and 212a are pivotally mounted at pivot points 210 and 210a on movable bell cranks or overload control levers 216 and 216a which are attached to an overload piston rod 217 at elongated slots 218 and 218a, shown in an alternate position, by pins 219 and 219a. The control levers 216 and 216a are also mounted on stationary pivot points aligned with pivot points 215 and 215a. The slots 218 and 218a are elongated to permit the pins 219 and 219a to move circumferentially on the piston rod 217 since, as the piston rod 217 moves in the direction of arrow A, the pins 219 and 219a must move through the arcs 221 and 221a. The adjustable levers 212 and 212a are also connected by links 222 and 222a to servo levers 223 and 223a, of conventional servos 224 and 224a which are operatively connected hydraulic pumps similar to the pumps of FIGURE 1, at pivot points 215, 215a, 226 and 226a.

The piston rod 217 is secured to a piston 227 which is slidably disposed in a cylinder 228 of an overload control motor 229. A return spring 230 urges the piston 227 to the position shown. The control motor has an overload inlet port 231 and an exhaust port 232. The overload inlet port 231 is in fluid communication with an overload control valve such as valve 110 shown in FIGURE 1. Thus, when an overload signal is present, the piston 227 and piston rod 217 are moved to the left so that the pins 219 and 219a move through the arcs 221 and 221a. As the pins 219 and 219a move through their respective arcs, the pivot points 210 and 210a are moved through arms 233 and 233a so that, when the pins 219 and 219a reach their alternate position 219' and 291a', the pivot points 210 and 210a are aligned with pivot points 226 and 226a.

To effect a displacement change of the hydrostatic pumps in equal amount and direction, the operator pivots the ratio control lever 201 in the direction of arrow B thereby causing the T lever 203 and the input links 207 and 207a to move in the direction of arrow C. Since the linkages operate in a similar manner, the motion resulting from the movement of input link 207 will be described. As input link 207 is moved, the pivot point 209 moves toward its alternate position 209' or 209", thereby causing lever 206 to rotate and the pivot point 214 to move toward its alternate position 214' or 214" resulting in movement of the link 213. The adjustable lever 212 connected to the link 213, therefore, rotates about pivot point 210 so that pivot point 215 moves through arc 234 toward its alternate position 215' or 215". This results in movement of link 222 which causes the servo lever 223 to rotate thereby changing the displacement of the pump. If an overload should occur, the pivot point 210 moves toward pivot point 226, as described above, so that the pivot point 215 no longer moves through arc 234 but moves through arc 234' instead. Since the adjustable lever 212 and link 222 are the same length, movement of pivot point 215 through arc 234' produces no movement in servo lever 223. As the adjustable lever 212 moves through arc 233 toward pivot point 226, movement of pivot point 215 has less effect on the servo lever 223.

To accomplish an equal but opposite displacement change in the hydrostatic pump, the T lever 203 is rotated, by the operator, in the direction of arrow D. This produces equal and opposite movement of the links 207 and 207a. As described above the motion of links 207 and 207a is transferred to the servo levers 223 and 223a. However, in this instance, the servo levers 223 and 223a will move in equal and opposite directions. The overload control motor 229 provides the same function to move the servo levers 223 and 223a toward the position shown when an overload signal is present.

Figure 4:
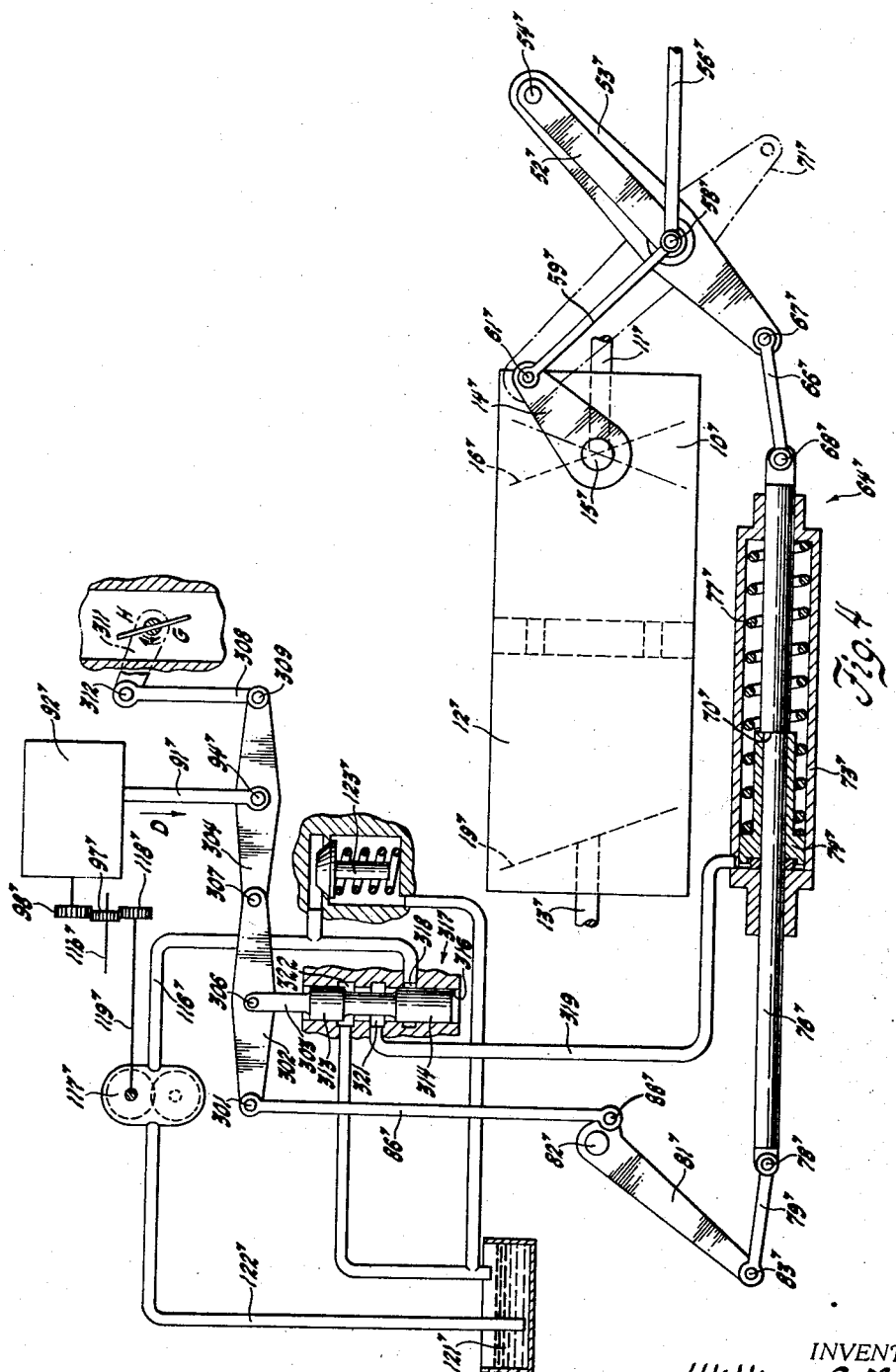
FIGURE 4 is a plan view of the linkage with an adjustable input power sensor and overload control shown in FIGURE 1 modified for use with another type of transmission.

The linkage shown in FIGURE 4 is similar to the linkage shown in FIGURE 1. It is, however, more particularly useful in track-laying vehicles in which a hydrostatic steer bias is imposed on the gearing of a mechanical or hydrokinetic planetary transmission. An example of such a transmission is shown and described in U.S. patent application Ser. No. 490,570, now U.S. Patent No. 3,373,636. Since the hydrostatic pump and motor are used only for steer control, they are not adapted to prevent engine overspeed. Thus, the overspeed control has been omitted. However, the steer system can cause a power overload on the engine. Also, in many vehicles using transmissions of this type, the engine must be operated over its full speed range instead of at a governed speed. Therefore, the overload control must function over a wide range of throttle settings.

As was stated above, the linkage is similar to that shown in FIGURE 1, therefore, all components of the linkage system in FIGURE 4 which have corresponding components in FIGURE 1 have been given the same numerical designation with a "prime." A description of the connection and operation of these components would be merely redundant of the description for FIGURE 1 and, therefore, is not repeated.

The link 86' is connected at pivot point 301 to a valve lever 302 which is connected to a valve spool 303 and a governor lever 304 at pivot points 306 and 307 respectively. The governor lever 304 is connected to the governor rod 91' and pivot point 94' and to a throttle link 308 at a pivot point 309. The throttle link 308 is connected to a throttle lever 311, which controls the engine power, at pivot point 312. The throttle, which is shown in the open position, is moved in the direction of arrow G to decrease power and in the direction of arrow H to increase power.

The valve spool 303 has two equal diameter lands 313 and 314 co-operating with a valve bore 316 to form an overload control valve 317. The valve 317 receives fluid from pump 117' via passage 116' at an inlet port 318 and directs fluid to and from the overload control motor 64' via passage 319 and a port 321, which is spaced between lands 313 and 314. In the position shown, port 321 is in fluid communication with an exhaust port 322 between lands 313 and 314. The overload control operates similar to that described above in FIGURE 1. That is, as the governor speed decreases, the governor rod 91' moves in the direction of arrow D causing the levers 304 and 302 and the valve spool 303 to move downward until the inlet port 318 is open to port 321 and the overload motor 64'. Thus the motor strokes to the right to swing overload control lever 53' toward its alternate position 71', thereby reducing the power load on the engine. To prevent hunting, the movement of piston rod 76' is fed back through the linkage as described above for FIGURE 1.

Movement of the throttle in the direction of arrow G moves the link 308 downward so that the governor lever pivots about point 94' thereby moving pivot point 307 upward and causing the valve lever 302 to pivot about point 301 to move the valve spool 303 upward. Therefore, a lower engine speed must be reached before the governor rod 91' will move a sufficient amount in the direction of arrow D before the control valve opens. This is necessary since at part throttle operation, the maximum engine torque and power occur at lower engine speeds.

Obviously many modifications and variations are possible in light of the above teachings. It is therefore to be understood that within the scope of the appended claims, the invention may be practiced otherwise than as specifically described.

What is claimed is:

1. In combination a variable displacement hydrostatic pump having an input shaft and an input power requirement; power control means responsive to said input power requirement including, a governor operatively connected to said input shaft, control valve means, and governor linkage means operatively connected between said governor and said control valve means; servo control means for controlling the displacement of said pump; motor means responsive to said power control means; and operator linkage control means for providing an operator control for said servo control means including, movable operator linkage means, operator lever means pivotally connected to said operator linkage means, a first link pivotally connected to said operator lever means, a second link operatively connected at pivot points between said first link and said servo control means, overload control lever means operatively connected to said motor means and movable thereby, adjustable lever means having a first pivot point coincidental with said connection between said first and second links and a second pivot point on said overload control lever means; so that movement of said operator linkage means causes said servo control to change the displacement of said hydrostatic pump to a value determined by the operator and said motor means being movable in response to the input power requirement of said hydrostatic pump to reduce the displacement of said pump to a value less than the value set by the operator at a predetermined input power level.

2. The invention defined in claim 1 and the movement of said motor means causing said overload control lever means and said adjustable lever means to pivot so that said second pivot point is axially aligned with the pivot point connection between said second link and said servo control means whereby movement of said operator linkage means causes no change in the displacement of said hydrostatic pump.

3. In a hydrostatic transmission, input means for providing input power; a pair of variable displacement hydrostatic pumps having input shafts operatively connected to said input means and an input requirement; a pair of hydrostatic motors each in fluid connection with one of said hydrostatic pumps; output means operatively connected to said hydrostatic motors; servo control means to control the displacement of said hydrostatic pumps; and control means including governor means operatively connected to said input shafts to provide an overload signal, valve means operative in response to said overload signal to deliver a power overload signal, governor linkage means operatively connected between said governor means and said valve means, operator linkage means operatively connected to said servo control means for providing an operator control to vary the displacement of said hydrostatic pumps including input linkage having an input movement, output linkage having an output movement, and being operatively connected to said servo-control means and adjustable pivot point linkage operatively connecting said input and output linkages to provide a variable relation between input and output movements, and overload control means operatively connected to said adjustable pivot point linkage and said valve means to adjust the adjustable pivot point linkage in response to the power overload signal of said valve means.

4. The invention defined in claim 3 and said control means further including a source of fluid pressure operatively connected to said valve means, and said valve means having open and closed positions so that said valve means opens in response to a predetermined overload signal to deliver said fluid pressure to said overload control means, and said overload control means including fluid motor means and feedback linkage means operatively connected between said fluid motor means and said governor linkage means, said fluid motor means being movable in response to said fluid pressure and said feedback linkage means being movable by said fluid motor to move said governor linkage means to close said valve means.

5. The invention defined in claim 3 and said governor means providing an overspeed signal; and said valve means being responsive to said overspeed signal to deliver an input overspeed signal; and said control means further including overspeed control means operatively connected to said input linkage means including input rod means, motor means drivingly connected to said input rod means and operatively connected to said valve means to receive the input overspeed signal therefrom, output rod means selectively connectatble to said input rod means, and toggle linkage means operatively connecting said output rod means to said valve means, said motor means being movable in response to said input overspeed signal to selectively connect and move said input and output rod means whereby said input linkage is moved by said input rod means and said toggle linkage means is moved by said output rod means to move said valve means to stop delivery of said input overspeed signal.

6. The invention defined in claim 4 and said governor means also providing an overspeed signal; and said valve means having another open position and being movable to said another open position in response to the overspeed signal to deliver an input overspeed signal; and said control means further including overspeed control means having input rod means operatively connected to said input linkage, fluid motor means drivingly connected to said input rod means and operatively connected to said valve means and movable in response to the input overspeed signal, output rod means selectively connectable to said input rod means and movable therewith when said fluid motor means responds to the input overspeed signal, and toggle linkage means operatively connected between said output rod means and said governor linkage means and being movable with said output rod means to move said governor linkage means to close said valve means.

7. The invention defined in claim 3 and said control means further including input power control means having throttle control means positionable to increase and decrease the input power and throttle linkage means operatively connected between said throttle control means and said governor linkage means to vary the delivery of said power overload signal in accordance with the position of said throttle control means.

8. The invention defined in claim 4 and said control means further including input power control means positionable to increase and decrease said input power and throttle linkage means operatively connected between said input power control means and said governor linkage means to vary the response of said valve to the overload signal so that said valve means remains in said closed position until a higher predetermined overload signal is present when said input power control means is positioned to increase the input power.

9. A transmission, for use with a driving engine having a speed range, including input means adapted to be driven by the engine; output means; variable hydrostatic drive ratio means operatively connecting said input and output means; servo control means to control the drive ratio of said hydrostatic drive ratio means; operator linkage control means operatively connected to said servo control means to provide an operator control therefor; and overspeed control means operatively connected between said input means and said operator linkage control means for increasing the drive ratio in response to an increase in input speed of the engine above said speed range requirement including governor means drivingly connected to said input means for providing an overspeed signal in response to the increase in input speed above said speed range, valve means responsive to said overspeed signal to deliver an overspeed control signal, governor linkage means operatively connected between said governor means and said valve means and overspeed motor means operatively connected to said valve means and selectively operatively connectable between said governor linkage means and said operator linkage control means in response to the overspeed control signal of said valve means to move said operator linkage control means to increase the drive ratio.

10. The invention defined in claim 9 and said overspeed motor means including an input rod having a central bore and a radial bore; piston means slidably mounted on said input rod and having a V groove circumjacent said radial bore of said input rod, and being movable in response to said overspeed control signal; a plurality of balls in said radial bore and said V groove; and an output rod slidably disposed in said central bore, and said piston means being responsive to said overspeed control signal to supply a force to said balls through said V groove to urge said balls into retaining contact with said output rod whereby said input rod, said output rod and said piston means are moved in unison in response to said overspeed control signal.

11. A variable displacement hydrostatic transmission including input means; output means; variable displacement hydraulic pump and motor means in fluid communication and operatively connected between said input and output means; displacement control means for controlling the displacement of said pump and motor means; governor signal means operatively connected to said input means for providing a governor signal; linkage control means including operator linkage means and adjustable lever means operatively connected between said operator linkage means and said displacement control means to control the displacement of said pump and motor means; and overload control means including motor means operatively connected to said governor means and responsive to said governor signal, and overload lever means operatively connected between said motor means and said adjustable lever means to override said linkage control means to control the displacement of said pump and motor means in response to said governor signal.

12. In a hydrostatic transmission; input means for providing input power at a preferred level and efficiency in a predetermined speed range; a pair of variable drive ratio hydrostatic transmissions each having a variable displacement hydrostatic pump having an input shaft operatively connected to said input means, a variable displacement hydrostatic motor, and a power circuit connection between the pump and motor; a pair of output means each operatively connected to one of said hydrostatic motors to provide a pair of output drives; a pair of transmission control means each operative to control the displacement of one hydrostatic pump and one hydrostatic motor by conjointly increasing pump displacement and reducing motor displacement to increase the drive ratio provided by each hydrostatic transmission; ratio control means providing a ratio demand signal operatively connected to each of said transmission control means for normally controlling the hydrostatic pump and motor displacement of each pump and motor to provide the same drive ratio and simultaneous changes thereof; steer control means operatively connected to said ratio control means to modify the action of said ratio control means to increase the drive ratio of one and decrease the drive ratio of the other of said transmission control means for steering from any ratio demand signal of said ratio control means and operative during steering to permit simultaneous change of the drive ratio by said ratio control means and maintain the same proportion of ratio in the transmission control means as determined by the steering control means; governor control means operatively connected to said input means and responsive to the speed of said input means for providing an overload signal when the speed of said input means is less than said predetermined speed range and an overspeed signal when the speed of said input means is more than the speed in said predetermined speed range; over control means operatively connecting said governor to said ratio control means and operative in response to said overload signal to reduce the drive ratio and operative in response to said overspeed signal to increase the drive ratio called for by said ratio control means without changing the proportion of the drive ratio of one transmission control means to the drive ratio of the other transmission control means as determined by the position of the steer control means.

13. In a hydrostatic transmission; input means for providing input power at a preferred level and efficiency in a normal speed range; a pair of variable displacement hydrostatic transmissions each having a pump having an input shaft operatively connected to said input means, a variable displacement hydrostatic motor, a power circuit connection between the pump and motor; a pair of output means each operatively connected to one of said hydrostatic motors to provide a pair of output drives; a pair of transmission control means, each operative to control the displacement of one of said hydrostatic transmissions by conjointly varying pump and motor displacement to vary the drive ratio provided by each hydrostatic transmission, ratio control means providing a ratio demand signal to each of said transmission control means for normally controlling the hydrostatic pump and motor displacement of each pump and motor to provide the same drive ratio and simultaneous changes thereof; steer control means each operatively connected to said ratio control means to modify the action of said ratio control means to increase the drive ratio of one and decrease the drive ratio of the other of said transmission control means for steering from any ratio demand signal of said ratio control means and operative during steering to permit simultaneous change of ratio by said ratio control means and maintain the same proportion of ratio in the transmission control means as determined by the steering control means; governor control means operatively connected to said input means and responsive to the speed of said input means for providing an overload signal when the speed of said input means is less than said normal range and an overspeed signal when the speed of said input means is less than said normal range and an overspeed signal when the speed of said input means is more than said normal range; over control means operatively connecting said governor to said ratio control means and operative in response to said overload signal to reduce the drive ratio and operative in response to said overspeed signal to increase the drive ratio called for by said control means without changing the proportion of the drive ratio of one transmission control means to the drive ratio of the other transmission control means as determined by the position of the steer control means; and feedback means operatively connected between said over control means and said governor means to modify said overload and overspeed signals to prevent rapid excessive drive ratio change.

14. In a hydrostatic transmission; input means for providing input power at a preferred level and efficiency in a predetermined speed range; a pair of variable drive ratio hydrostatic transmissions each having a variable displacement hydrostatic pump having an input shaft operatively connected to said input means, a variable displacement hydrostatic motor, a power circuit connection between the pump and motor; a pair of output means each operatively connected to one of said hydrostatic motors to provide a pair of output drives; a pair of transmission control means each operative to control the displacement of one hydrostatic pump and one hydrostatic motor by conjointly increasing pump displacement and reducing motor displacement to increase the drive ratio provided by each hydrostatic transmission; ratio control means providing a ratio demand signal operatively connected to each of said transmission control means for normally controlling the hydrostatic pump and motor displacement of each pump and motor to provide the same drive ratio and simultaneous changes thereof; steer control means operatively connected to said ratio control means to modify the action of said ratio control means to increase the drive ratio of one and decrease the drive ratio of the other of said transmission control means for steering from any ratio demand signal of said ratio control means and operative during steering to permit simultaneous change of the drive ratio by said ratio control means and maintain the same proportion of ratio in the transmission control means as determined by the steering control means; governor control means operatively connected to said input means and responsive to the speed of said input means for providing an overspeed signal when the speed of said input means is more than the speed in said predetermined speed range; over control means operatively connecting said governor to said ratio control means and operative in response to said overspeed signal to increase the drive ratio called for by said ratio control means without changing the proportion of the drive ratio of one transmission control means to the drive ratio of the other transmission control means as determined by the position of the steer control means.

15. In a hydraulic transmission; input means for providing input power at a preferred level and efficiency in a normal speed range; a pair of variable displacement hydrostatic transmissions each having a pump having an input shaft operatively connected to said input means, a variable displacement hydrostatic motor, a power circuit connection between the pump and motor; a pair of output means each operatively connected to one of said hydrostatic motors to provide a pair of output drives; a pair of transmission control means each operative to control the displacements of one of said hydrostatic transmissions by conjointly varying pump and motor displacement to vary the drive ratio provided by each hydrostatic transmission; ratio control means providing a ratio demand signal to each of said transmission control means for normally controlling the hydrostatic pump and motor displacement of each pump and motor to provide the same drive ratio and simultaneous changes thereof; steer control means each operatively connected to one of said ratio control means to modify the action of said ratio control means to increase the drive ratio of one and decrease the drive ratio of the other of said transmission control means for steering from any ratio demand signal of said ratio control means and operative during steering to permit simultaneous change of ratio by said ratio control means and maintain the same proportion of ratio in the transmission control means as determined by the steering control means; governor control means operatively connected to said input means and responsive to the speed of said input means for providing an overload signal when the speed of said input means is less than said normal range; over control means operatively connecting said governor to said ratio control means and operative in response to said overload signal to reduce the drive ratio without changing the proportion of the drive ratio of one transmission control means to the drive ratio of the other transmission control means as determined by the position of the steer control means; and feedback means operatively connected between said over control means and said governor means to modify said overload signal to prevent rapid excessive drive ratio change.

16. In a hydrostatic transmission; input means for providing input power at a preferred level and efficiency in a normal speed range; a pair of variable displacement hydrostatic transmissions each having a pump having an input shaft operatively connected to said input means, a variable displacement hydrostatic motor, a power circuit connection between the pump and motor; a pair of output means each operatively connected to one of said hydrostatic motors to provide a pair of output drives; a pair of transmission control means each operative to control the displacement of one of said hydrostatic transmissions by conjointly varying pump and motor displacement to vary the drive ratio provided by each hydrostatic transmission; ratio control means providing a ratio demand signal to each of said transmission control means for normally controlling the hydrostatic pump and motor displacement of each pump and motor to provide the same drive ratio and simultaneous changes thereof; steer control means each operatively connected to one of said ratio control means to modify the action of said ratio control means to increase the drive ratio of one and decrease the drive ratio of the other of said transmission control means for steering from any ratio demand signal of said ratio control means and operative during steering to permit simultaneous change of ratio by said ratio control means and maintain the same proportion of ratio in the transmission control means as determined by the steering control means; governor control means operatively connected to said input means and responsive to the speed of said input means for providing an overspeed signal when the speed of said input means is more than said normal range; over control means operatively connecting said governor to said ratio control means and operative in response to said overspeed signal to increase the drive ratio called for by said ratio control means without changing the proportion of the drive ratio of one transmission control means to the drive ratio of the other transmission control means as determined by the position of the steer control means; and feedback means operatively connected between said over control means and said governor means to modify said overspeed signal to prevent rapid excessive drive ratio change.

17. In an engine driven transmission and control; variable displacement hydrostatic drive means driven by the engine; hydrostatic driven means in fluid communication with said hydrostatic drive means; displacement control means including a servo control for controlling the displacement of said hydrostatic drive means; engine parameter control means for providing a control signal varying with an engine parameter; control means including fluid motor means operatively connected between said engine parameter control means and said servo control for controlling said displacement control means to vary displacement in response to the control signal; and feedback control means operatively connected between said engine parameter control means and said control means for providing a feedback signal, from said control means to said engine parameter control means for modifying the control signal value relative to the engine parameter value in response to movement of the fluid motor to prevent rapid and excessive displacement changes of said hydrostatic drive means.

18. The invention defined in claim 17 and said displacement control means including operator control means; and adjustable linkage means operatively connected to the operator control means and the servo control, and being operatively connected to said fluid motor means for controlling the relationship between the operator control means and the servo control in response to movement of the fluid motor means.

19. The invention defined in claim 17 and said engine parameter control means including an engine driven governor and valve means operatively connected with and movable in response to said governor and in fluid communication with said fluid motor means for controlling the delivery of fluid to said fluid motor means in response to said governor.

20. The invention defined in claim 19 and said feedback control means including linkage means operatively connected between said fluid motor means and said valve means for moving said valve means in response to movement of said fluid motor means to discontinue delivery of fluid to said fluid motor means.

21. The invention defined in claim 20 and said displacement control means including operator control means; servo control means operatively connected to said hydrostatic drive means for controlling the displacement thereof; and adjustable linkage means operatively connected to the operator control means and the servo control means, and being operatively connected to said fluid motor means for controlling the relationship between the operator control means and the servo control means in response to movement of the fluid motor means.

References Cited

UNITED STATES PATENTS 3,054,263   9/1962   Budzich et al.
3,161,245  12/1964   Thoma _____ 60—19 XR
3,284,999  11/1966   Lease _____ 60—19
3,371,479   3/1968   Yapp et al. _____ 60—19

EDGAR W. GEOGHEGAN, Primary Examiner

U.S. Cl. X.R.

60—53; 180—6.48, 66

PO-1050
(5/69)

UNITED STATES PATENT OFFICE
CERTIFICATE OF CORRECTION

Patent No. 3,500,633  Dated March 17, 1970

Inventor(s) William G. Livezey

It is certified that error appears in the above-identified patent and that said Letters Patent are hereby corrected as shown below:

Column 6, line 55, delete "arms" and insert -- arcs --;
    line 56, delete "291a'" and insert -- 219a' --;

Column 12, line 35, delete "hydraulic" and insert
    -- hydrostatic -- .

SIGNED AND
SEALED
NOV 17 1970

(SEAL)
Attest:

Edward M. Fletcher, Jr.
Attesting Officer

WILLIAM E. SCHUYLER, JR.
Commissioner of Patents